United States Patent Office 3,420,160
Patented Jan. 7, 1969

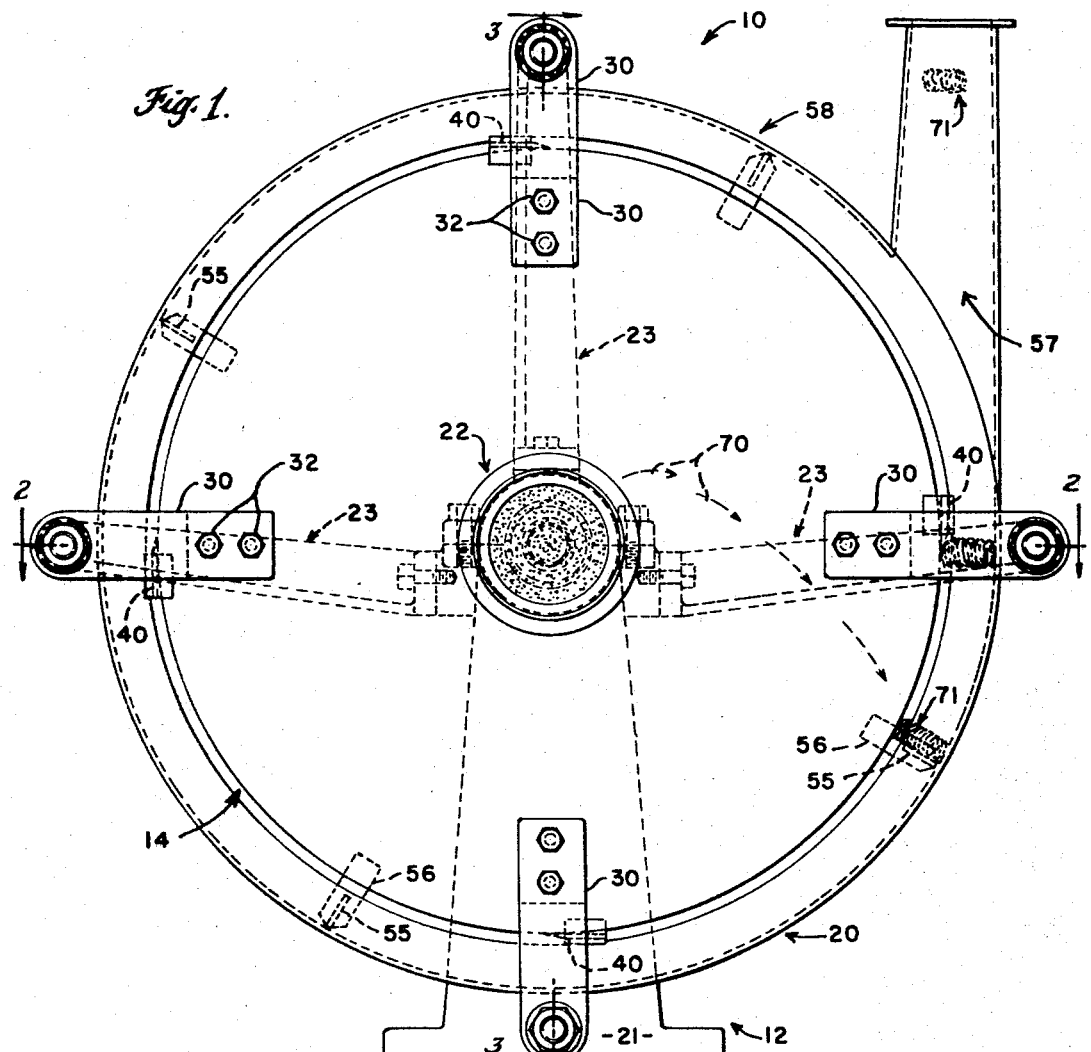

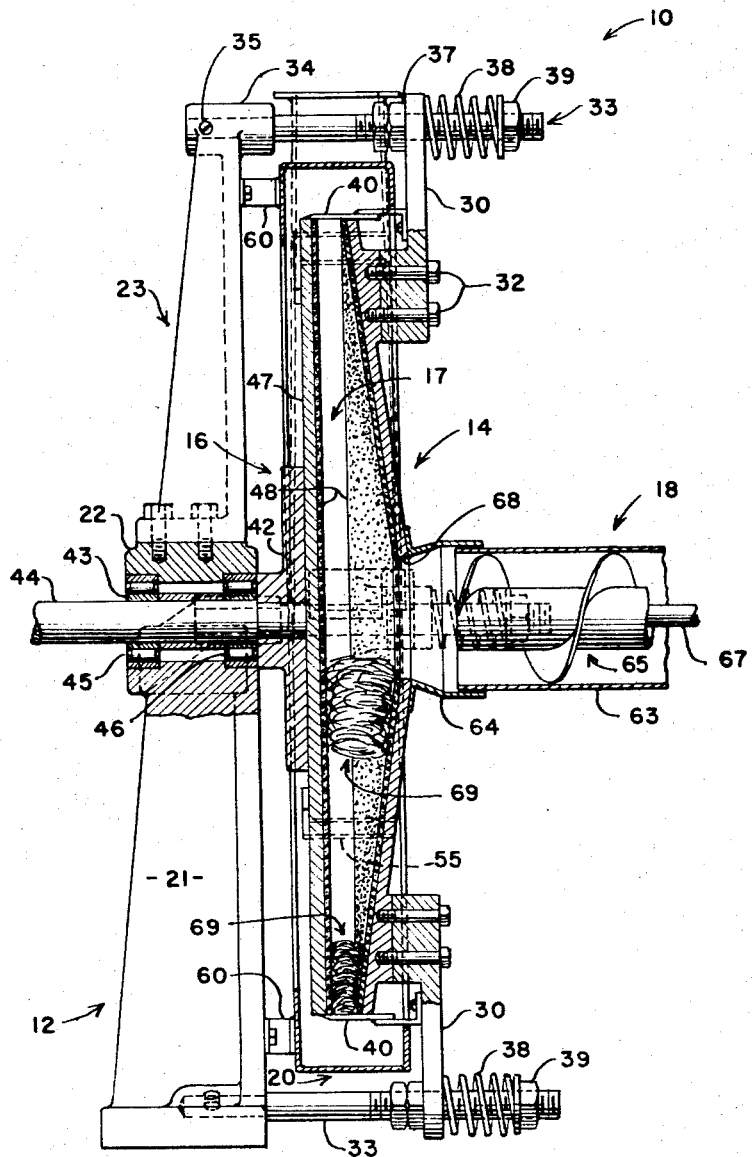

3,420,160
WAFERING DEVICE
Aquila D. Mast, Lancaster, Pa., assignor to Sperry Rand Corporation, New Holland, Pa., a corporation of Delaware
Filed Feb. 3, 1967, Ser. No. 613,851
U.S. Cl. 100—39          10 Claims
Int. Cl. B30b *13/00*

ABSTRACT OF THE DISCLOSURE

A hay wafer forming device for condensing hay and other crop materials into relatively small units to facilitate their handling by mechanical means wherein the hay is compressed, rolled, and twisted between opposed plate-like members.

Background of the invention

This invention relates to machines of the type in which field mown hay is, for purposes of transport, storage, and feeding, wrapped in relatively small rolls of suitable density. The hay is retained in this form until it is fed to animals.

The conventional method of preserving hay or other forage crops for storage and eventual feeding to animals is to form the material into relatively large bales; the bales often weigh in excess of fifty pounds and are retained in the baled form by the use of wire or twine. The practice of this method of preserving hay is dependent on the moisture content of the crop material and the weather conditions existing at the time when it is desired to bale the hay. The bales of hay are difficult to handle, and a considerable amount of labor is involved in storing the bales.

In recent years, machines have been developed which form the hay into relatively small compact pellets, or wafers. The small pellets can be handled by mechanical means, and the pellets are self-supporting so that no wire or twine is needed. Further, in many cases the pellets can be formed without waiting for the crop material to reach the degree of dryness required for baling. The machines for forming the pellets can be divided into two general classes. In the first class, the pellets are formed in a ring die and the crop material is compressed in the die by means of rollers, or pistons, or a combination of the two. In the second class, crop material is twisted and compressed into a roll or core, and the core is then cut into wafers of edible size.

In the hay twisting devices known heretofore, relatively complicated spindle or roller units are used to form the core. Normally, a plurality of core-forming units must be used in each machine, and each of the units requires a separate feed means to insure a uniform product. Thus, a considerable amount of apparatus is required to form each core. Further, the division of the incoming material to feed each of the units tends to substantially reduce the capacity of the machine.

Summary of the invention

Applicant's invention relates to a wafering device in which hay, or other crop material, is fed between a pair of plate-like elements. One of the elements, known as the pressure plate, is stationary; the other element is rotatably mounted in spaced relation to the pressure plate and defines a core-forming chamber therewith. Crop material fed into the chamber is subjected to a centrifugal, spiral, wedging action which causes the material to be progressively compressed and rolled into a rope, or roll, hereinafter referred to as a core. The core moves radially outward as a result of the force of incoming hay and the centrifugal force created by the rotating member.

The wafering device is fed through a central opening in the pressure plate by a conventional auger. Knives are mounted adjacent the peripheral edges of the plates for cutting the core into wafers of suitable lengths as the core emerges from the plates. The wafers pass into a housing which surrounds the two pressure plates. Blades mounted on the rotatable plate and operable within the housing propel the wafers out through an opening in the housing and into a wagon or container.

The wafering device disclosed herein is used in a field machine having a hay pickup, and being adapted for travel through a field. One example of the type of machine referred to is shown in the patent to Molitorisz, No. 3,191,366.

A principal object of this invention is to provide a wafering device, in a machine of the type described, which is greatly simplified and can be constructed with a substantial reduction in the number of parts required to build units known heretofore.

Another object of this invention is to provide a wafering device so constructed that only one wafer-forming unit is required in each field machine.

Another object of this invention is to provide a wafering device which can accommodate substantial variations in the quantity of crop material fed into the device.

A further object of this invention is to provide a wafering device in which the density and length of the wafer can be easily controlled.

A still further object of this invention is to provide a wafering device in which fibrous material is consolidated by a rolling and compressing action which reduces the friction between the material and the apparatus and thereby reduces the power required to form the wafers.

Other objects of this invention will be apparent hereinafter from the specification and from the recital in the appended claims.

In the drawings:

FIG. 1 is a front view of the wafering device, with the feed auger omitted for clarity;

FIG. 2 is a sectional view, taken on line 2—2 of FIG. 1;

FIG. 3 is a sectional view, taken on line 3—3 of FIG. 1.

Description of preferred embodiment

Referring now to the drawings by numerals of reference, and particularly to FIG. 3, the wafering device of this invention is designated generally 10, and comprises a support frame 12, a pressure plate 14, a rotating disc 16 axially aligned with plate 14 and forming a core-forming chamber 17 therewith, feed means 18, and a circular housing 20.

As shown in FIGS. 1 and 3, support frame 12 comprises a base portion 21, a journal box 22, and radial arms 23 extending from box 22.

Pressure plate 14, as shown in FIG. 3, has a concave interior face which forms one wall of chamber 17, and a gripping material 48, such as rubber, is applied to the concave face. Plate 14 is connected to support frame 12 through a plurality of brackets 30 equally spaced around its periphery. Brackets 30 are fixed to pressure plate 14 by means of fasteners 32 and are connected to threaded rods 33 extending from the radially outward ends of arms 23. Rods 33 extend through sleeves 34 in arms 23 and are held therein by means of lock screws 35. Adjustable nuts 37 on rods 33 are provided to determine the minimum clearance between pressure plate 14 and rotating disc 16. A spring 38 abuts the opposite side of each bracket 30 to bias plate 14 toward disc 16, and nuts 39 are provided to put an initial compression in springs 38. A plurality of knives 40 are connected to brackets 30 for severing the core into wafers of generally uniform length.

Rotatable disc 16 comprises a support hub 42 which is fixed to a sleeve 43 keyed to a shaft 44. Shaft 44 is adapted to be rotated in a counterclockwise direction, as viewed in FIG. 1, by a drive means, not shown. Sleeve 43 is carried by bearings 45 and 46 in journal box 22. A flat circular plate 47 is fixed to support hub 42, and gripping material 48 is applied to the interior surface of the plate. Thrower blades 55 supported by arms 56 are attached to rotating disc 16 and serve to throw material out of outlet 57 in the circular housing 20. Housing 20 is mounted on support frame 12 by brackets 60.

Feed means 18 comprises an auger housing 63 mounted to cylindrical element 64 on pressure plate 14, and an auger 65 in housing 63. Auger 65 is driven through shaft 67 by drive means, not shown, and delivers material into chamber 17 through an opening 68 in plate 14.

In operation, material is continuously fed into chamber 17 by feed means 18. A rolling and twisting movement will be imparted to the material by rotating disc 16, and as the core starts to form it will begin to move outwardly aided by centrifugal force and the force of incoming material. The compressive force on the material becomes greater as the core advances radially and is at its highest point just before the core exits from the chamber. A core 69 of crop material is shown at two different radial locations in FIG. 3. The path of travel of a core of crop material as it is being formed is indicated by the arrows 70 in FIG. 1. When the crop material reaches the area radially outward from pressure plate 14 and disc 16, it will be contacted by blades 55 on rotating disc 16. The crop material will then be moved circumferentially against one of the knives 40 and wafers 71, cut from the core, are thrown through outlet 57.

The type of core formed in the disclosed device depends on the material being pelleted, the speed of disc 16, and the setting of springs 38. The density of the core can be controlled by springs 38. The length of the wafers formed will be determined by the number of knives 40 and to some extent, by the speed of disc 16. For some types of material, a continuous core is formed which moves circumferentially as well as radially. In other materials, the core tends to separate when it reaches a certain length in the chamber, and the portions which separate move out of the chamber individually.

From the foregoing description, it will be seen that a rugged and simple structure for forming wafers is disclosed. Due to the volume of chamber 17 in which the wafers are formed, a single core-forming unit is sufficient for a field machine. Thus, the usual problems of dividing the incoming material so that a plurality of twisting elements can be fed uniformly are eliminated.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A machine for forming wafers from hay or like fibrous material comprising:
   support means;
   compressing means carried by said support means for receiving material and compressing it into a dense core, said compressing means including first and second plate-like members arranged coaxially to provide between them a central core forming chamber;
   feed means for conveying material into said chamber; and
   means for rotating one of said members to twist and roll the material and move it radially outward as it is formed into a core.

2. A machine, as recited in claim 1, wherein said first member is generaly circular and has a substantially planar material engaging surface, a rotatable shaft is fixed to said first member, and said shaft is journalled in said support means.

3. A machine, as recited in claim 2, wherein said second member is generally circular and has a concave material engaging surface, said feed means is fixed to a central portion of said second member and communicates with a central opening therein, and said feed means comprises an auger.

4. A machine, as recited in claim 3, wherein a plurality of mounting brackets are fixed to the outer periphery of said second member, and said brackets are yieldably connected to said support means whereby said second member can move axially relative to said first member.

5. A machine, as recited in claim 1, wherein each of said members has an interior surface which forms a wall of said chamber, and a gripping material is applied to said surfaces.

6. An agricultural machine for forming wafers from hay or like fibrous material comprising:
   support means;
   compressing means carried by said support means for receiving material and compressing it into a dense core, said compressing means including first and second plate-like members arranged to provide between them a central core forming chamber;
   feed means for conveying material into said chamber;
   means for rotating one of said members to twist and roll the material and move it radially outward as it is formed into a core; and
   knife means carried by said support means, said knife means being adapted to cut the core into wafers of relatively uniform size as the core moves out of said chamber.

7. An agricultural machine, as recited in claim 6, wherein said members are generally circular, a housing extends around said members, said housing has a discharge outlet, radially extending blades are fixed to the outer periphery of said rotating member to force said core against said knife means and to fling the wafers out of said outlet.

8. A method for forming wafers from hay and like fibrous material comprising the steps of:
   (a) continuously feeding material into the central portion of a chamber formed by a pair of axially aligned plate-like members;
   (b) rolling and compressing said material into a dense core by rotating one of said plate-like members relative to other;
   (c) forcing said core radially outward by the action of incoming material and the action of centrifugal force; and
   (d) cutting said core into wafers of relatively uniform size as it emerges from said chamber.

9. A method, as recited in claim 8, wherein said core is subjected to an increasingly greater compressive force as it moves radially outward.

10. A method, as recited in claim 9, wherein a tangential force is applied to said wafers as they are formed to propel them into a storage facility.

References Cited

UNITED STATES PATENTS

| | | | |
|---|---|---|---|
| 2,356,122 | 8/1944 | Edwards | 100—158 |
| 2,640,226 | 6/1953 | Yehling | 18—1 |
| 2,914,797 | 12/1959 | Cavanagh | 18—1 |

FOREIGN PATENTS

| | | |
|---|---|---|
| 7,980 | 6/1927 | Australia. |
| 577,406 | 6/1924 | France. |
| 743,394 | 1/1933 | France. |
| 152,724 | 12/1955 | Sweden. |

BILLY J. WILHITE, *Primary Examiner.*

U.S. Cl. X.R.

18—1; 100—95, 156, 210